(12) United States Patent
Lee

(10) Patent No.: US 9,706,042 B2
(45) Date of Patent: Jul. 11, 2017

(54) METHOD AND APPARATUS FOR INDICATING TIME ZONE CHANGES IN A WIRELESS ACCESS SYSTEM

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/122,474

(22) PCT Filed: Mar. 20, 2015

(86) PCT No.: PCT/KR2015/002734
§ 371 (c)(1),
(2) Date: Aug. 30, 2016

(87) PCT Pub. No.: WO2015/142107
PCT Pub. Date: Sep. 24, 2015

(65) Prior Publication Data
US 2017/0078470 A1    Mar. 16, 2017

Related U.S. Application Data

(60) Provisional application No. 61/955,800, filed on Mar. 20, 2014, provisional application No. 61/991,636, (Continued)

(51) Int. Cl.
*H04M 3/42* (2006.01)
*H04M 1/725* (2006.01)
*H04W 4/00* (2009.01)

(52) U.S. Cl.
CPC ....... *H04M 1/72569* (2013.01); *H04W 4/001* (2013.01)

(58) Field of Classification Search
CPC .................. H04M 1/72569; H04W 4/001
See application file for complete search history.

(56) References Cited

U.S. PATENT DOCUMENTS 7,460,486 B2 * 12/2008 Hopkins ............. H04W 4/12
340/7.51
2004/0203620 A1 * 10/2004 Thome ............... H04L 12/58
455/412.1

(Continued)

OTHER PUBLICATIONS

PCT International Application No. PCT/KR2015/002734, Written Opinion of the International Searching Authority dated Jun. 12, 2015, 12 pages.

*Primary Examiner* — Ajit Patel
(74) *Attorney, Agent, or Firm* — Lee Hong Degerman Kang Waimey

(57) ABSTRACT

The present invention relates to a method and apparatus for indicating time zone changes. In one aspect of the present invention, a method for indicating a time zone change is performed by a user equipment (UE) and comprises steps of: receiving, from a first eNode-B (eNB) a first Mobility Management (MM) information message including first time zone information; storing the first time zone information and displaying a first time on a screen based on the first time zone information; moving from an area of the first eNB to an area of a second eNB; receiving, from the second eNB a second MM information message including second time zone information; checking a time zone is changed or not by comparing the first time zone information with the second time zone information; and displaying a second time according to the second time zone information on the screen when the time zone is changed.

10 Claims, 13 Drawing Sheets

Related U.S. Application Data filed on May 12, 2014, provisional application No. 61/992,900, filed on May 14, 2014.

(56) References Cited

U.S. PATENT DOCUMENTS

| | | | |
|---|---|---|---|
| 2006/0158963 A1* | 7/2006 | O'Neill | G04G 15/00 |
| | | | 368/46 |
| 2007/0189121 A1 | 8/2007 | Assuncao et al. | |
| 2010/0099455 A1 | 4/2010 | Bari et al. | |
| 2011/0250902 A1 | 10/2011 | Huang et al. | |
| 2011/0280108 A1* | 11/2011 | Honda | G04R 20/06 |
| | | | 368/21 |
| 2012/0058776 A1* | 3/2012 | Ligeret | H04L 12/5895 |
| | | | 455/456.1 |
| 2012/0127196 A1 | 5/2012 | Landry | |
| 2013/0036184 A1 | 2/2013 | Hung et al. | |
| 2014/0099975 A1* | 4/2014 | Pierce, II | H04W 4/02 |
| | | | 455/456.3 |
| 2014/0149560 A1* | 5/2014 | Hakami | H04L 67/1095 |
| | | | 709/221 |

* cited by examiner

FIG. 5
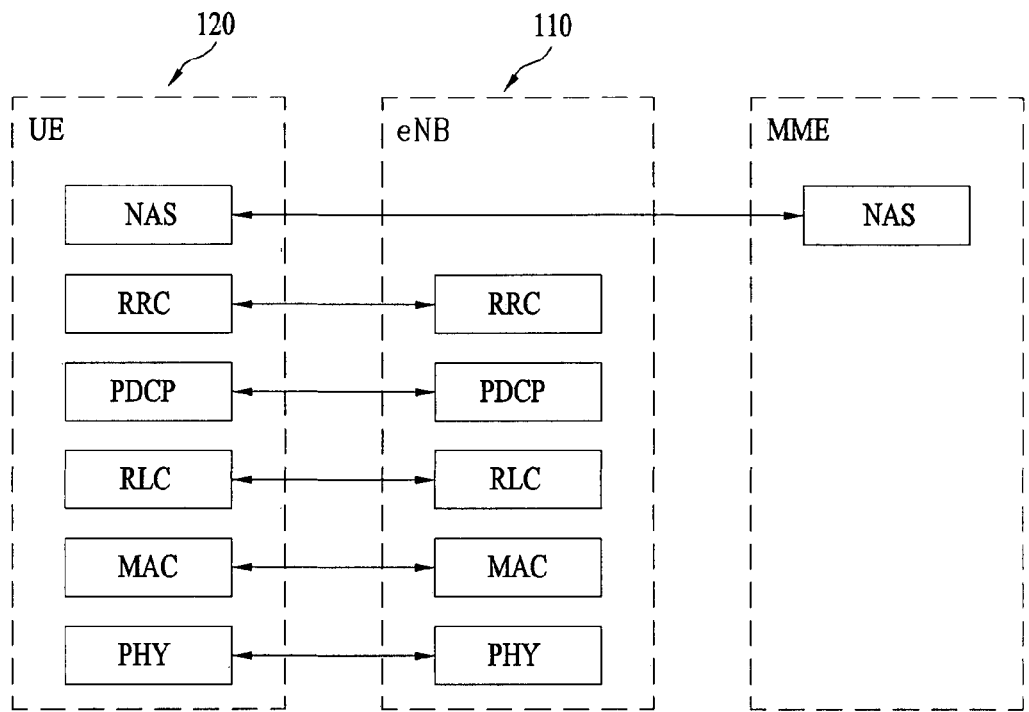
(a) contol - plane protocol stack
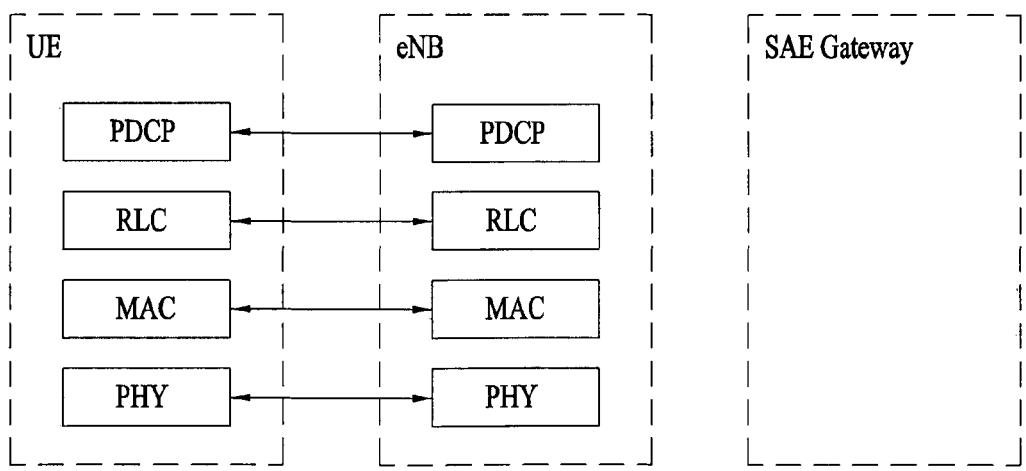
(b) user - plane protocol stack

FIG. 6

Bits

| Octets | 8 | 7 | 6 | 5 | 4 | 3 | 2 | 1 |
|---|---|---|---|---|---|---|---|---|
| 1 | \multicolumn{8}{c} Type = 153 (Decimal) |
| 2-3 | \multicolumn{8}{c} Length = 2 |
| 4 | \multicolumn{8}{c} Time Zone |
| 5 | Spare | Spare | Spare | Spare | Spare | Spare | \multicolumn{2}{c} Daylight Saving Time |

| Octets | Bits 8 | 7 | 6 | 5 | 4 | 3 | 2 | 1 |
|---|---|---|---|---|---|---|---|---|
| 1 | Type = 153 (Decimal) |||||||||
| 2-3 | Length = 2 |||||||||
| 4 | Time Zone |||||||||
| 5 | Spare | Spare | Spare | Spare | Spare | Spare | Daylight Saving Time ||

FIG. 7

Bits

| Octets | 8 | 7 | 6 | 5 | 4 | 3 | 2 | 1 |
|---|---|---|---|---|---|---|---|---|
| 1 | Type = 153 (Decimal) |||||||||
| 2-3 | Length = 2 |||||||||
| 4 | Time Zone |||||||||
| 5 | Spare | Spare | Spare | Spare | Time_Interval || Daylight Saving Time ||

FIG. 11
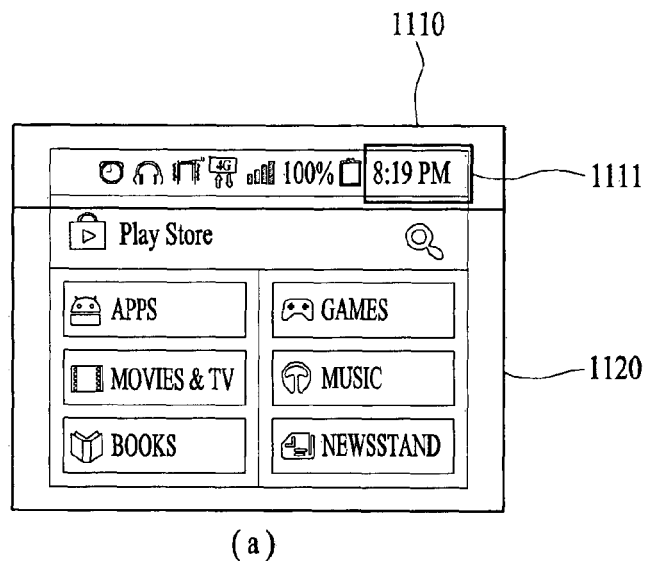
(a)
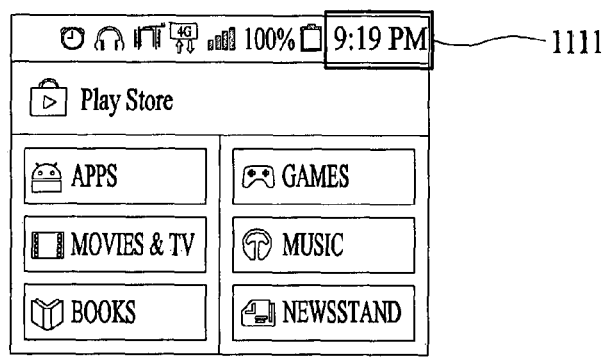
(b)
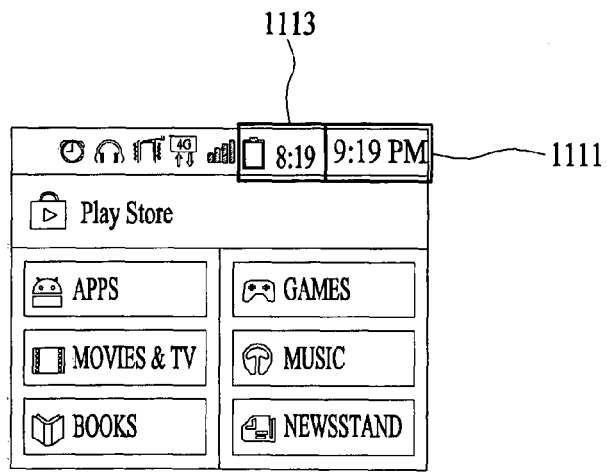
(c)

METHOD AND APPARATUS FOR INDICATING TIME ZONE CHANGES IN A WIRELESS ACCESS SYSTEM

CROSS-REFERENCE TO RELATED APPLICATIONS

This application is the National Stage filing under 35 U.S.C. 371 of International Application No. PCT/KR2015/002734, filed on Mar. 20, 2015, which claims the benefit of U.S. Provisional Application Nos. 61/955,800, filed on Mar. 20, 2014, 61/991,636, filed on May 12, 2014 and 61/992,900, filed on May 14, 2014, the contents of which are all hereby incorporated by reference herein in their entirety.

TECHNICAL FIELD

The present invention relates to a wireless access system, and more particularly, to methods and apparatus for indicating time zone changes.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In the wireless communication system, there are time-zone boundaries more than tens of thousands of miles long over the globe. FIG. 1 illustrates time zones of the United States. Referring to FIG. 1, the geographic length of the time-zone boundary between Pacific Time zone and Mountain Time zone is more than 1,500 miles in the United States.

A User Equipment (UE) in the boundary cell (which is the cell one or more of which boundary cells have different time zone value) has a high likelihood to be handed over to the next cell which belongs to a different time zone. Referring to FIG. 2, the UE 1 moves from the Mountain Time Zone to the Pacific Time Zone when the UE 1 has made a series of moves crossing the boundary of Time Zones from one to another or back and forth.

Under this situation, some of smartphones (i.e. a UE) have an option that the user can choose whether to use "Automatic update" on the time zone value whenever it receives "Automatic time zone" information indicating the time zone has been changed. In this case, if the user sets the "Automatic time zone" menu, the time of the UE is automatically changed according to the "time zone" information. However, it is difficult to recognize the time has been changed because there is no notification to the user whether the time is changed.

In addition, if the user does not set the "Automatic time zone" menu option, the time zone of the UE is not changed until the user of the UE manually resets the time zone. In this case, it is cumbersome to the user because the user has to manually reset the time of UE according to the "Automatic time zone" information.

Moreover, in aspect of the network, the specification on a Network Identity and Time Zone (NITZ) does not specify a Man-Machine Interface such that the user located near the boundary may not recognize what the current time zone when the said user unknowingly passes the boundary between the two adjacent time zones. Therefore, the time zone of the UE is automatically changed without any notice to the user, and this can lead confusion of the user due to misunderstanding of the changed time which is displayed based on the unknowingly changed time zone near the boundary of the time zones.

DETAILED DESCRIPTION OF THE INVENTION

Technical Problems

Accordingly, the object of the present invention is to provide methods and apparatuses for indicating time zone changes.

Another object of the present invention is to provide user interfaces for notifying the time zone changes.

Still another object of the present invention is to provide apparatus such as a user equipment (UE) and/or a base station for supporting the above-described methods.

Technical problems to be solved by the present invention are not limited to the above-mentioned technical problem, and other technical problems not mentioned above can be clearly understood by one skilled in the art from the following description.

Technical Solutions

The present invention relates to a method and apparatus for indicating time zone changes.

In one aspect of the present invention, a method for indicating a time zone change in a wireless access system, the method is performed by a user equipment (UE) and comprises steps of: receiving, from a first eNode-B (eNB) a first Mobility Management (MM) information message including first time zone information; storing the first time zone information and displaying a first time on a screen based on the first time zone information; moving from an area of the first eNB to an area of a second eNB; receiving, from the second eNB a second MM information message including second time zone information; checking a time zone is changed or not by comparing the first time zone information with the second time zone information; and displaying a second time according to the second time zone information on the screen when the time zone is changed.

In another aspect of the present invention, a user equipment (UE) for indicating a time zone change in a wireless access system, the UE comprises a screen; a receiver; and a processor configured to indicate the time zone change by controlling the screen and the receiver.

The processor may be configured to receive, from a first eNode-B (eNB) through the receiver, a first Mobility Management (MM) information message including first time zone information; store the first time zone information and display a first time on the screen based on the first time zone information; receive, from the second eNB through the receiver, a second MM information message including second time zone information; check a time zone is changed or not by comparing the first time zone information with the second time zone information; and display a second time according to the second time zone information on the screen when the time zone is changed.

In aspect of the present invention, the second time may be displayed with different color in a time region on the screen during a certain period for indicating the time zone change.

In another aspect of the present invention, the second time may be displayed in a first time region on the screen, the first time is displayed in a second time region on the screen with shrunk size compared to the second time for predetermined time, and the first time and the second time are simultaneously displayed for the predetermined time. In this case, the first time is fading out on the screen after the predetermined time. In addition, the second time may be blinking in the second time region for a certain period for indicating the time zone change.

In other aspect of the present invention, the second MM information message may further include a time interval field indicating a length of time for the UE to keep a first change of the time zone before executing a second change of the time zone if the second change of the time zone is detected. In this case, the UE performed the checking according to the time interval field.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, the user cognitive will be increased by using the method and user interface disclosed in the present invention, when the time zone is changed.

Besides, under the IOPS situation, the public safety officer is able to easily know the change of the time zone.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates the configurations of a radio interface protocol between the E-UTRAN and a UE;

FIG. 6 illustrates one of MS Time Zone IEs used in the present invention;

FIG. 7 illustrates another of MS Time Zone IE used in the present invention;

FIG. 11 illustrates the screen of the UE applied to the embodiments of the present invention.

BEST MODE FOR CARRYING OUT THE INVENTION

Figure 1:
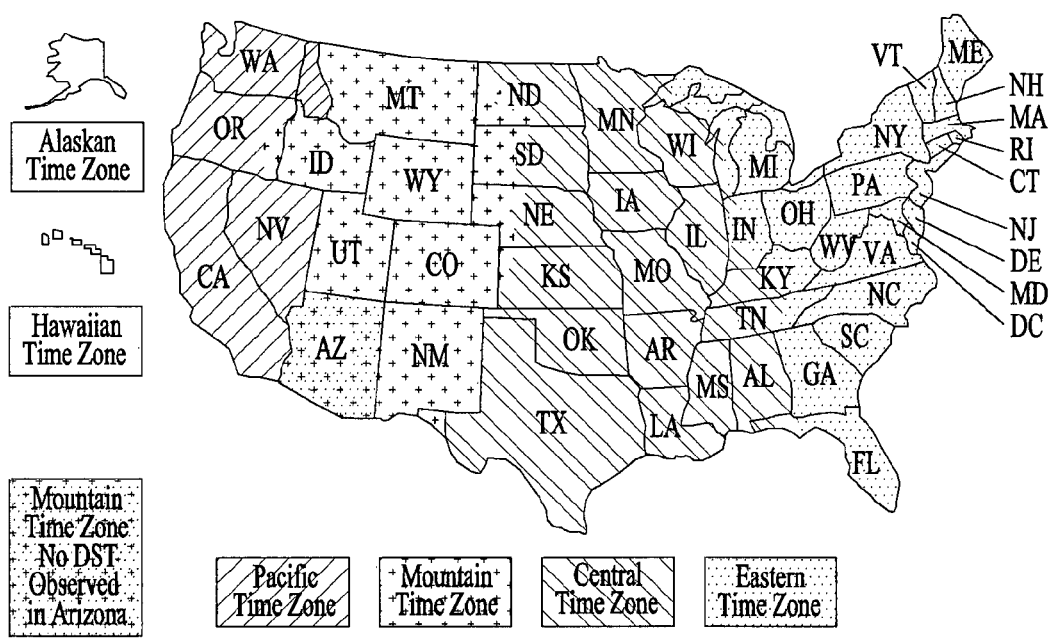
FIG. 1 illustrates time zones of the United States.
Figure 2:
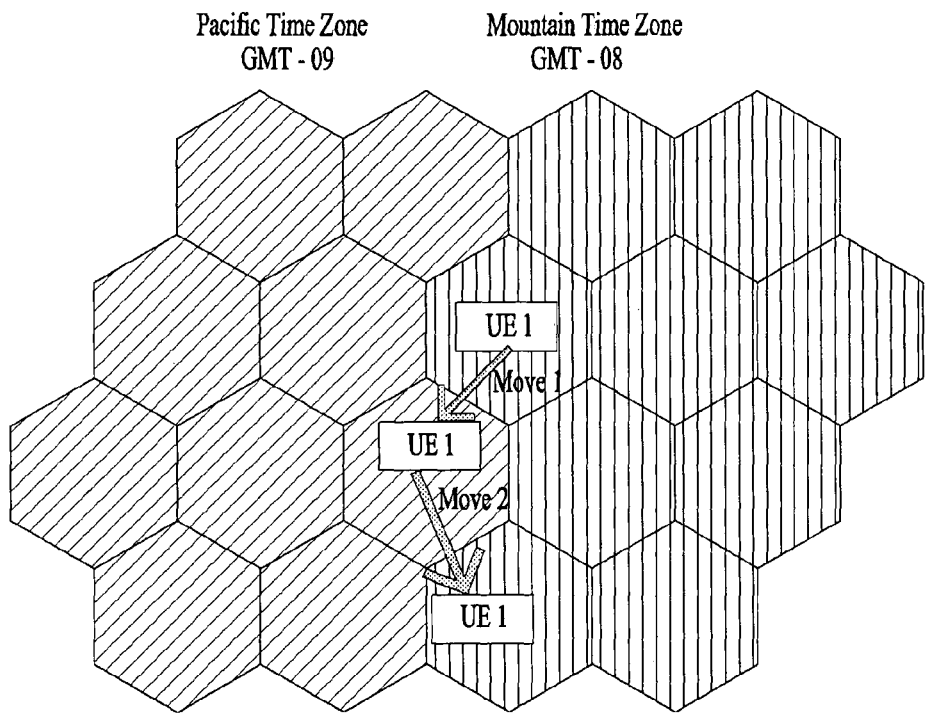
FIG. 2 illustrates a UE which makes a series of moves crossing the boundary of Time Zones.

Exemplary embodiments of the present invention provide a method and apparatus for indicating time zone changes.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.011, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

Figure 3:
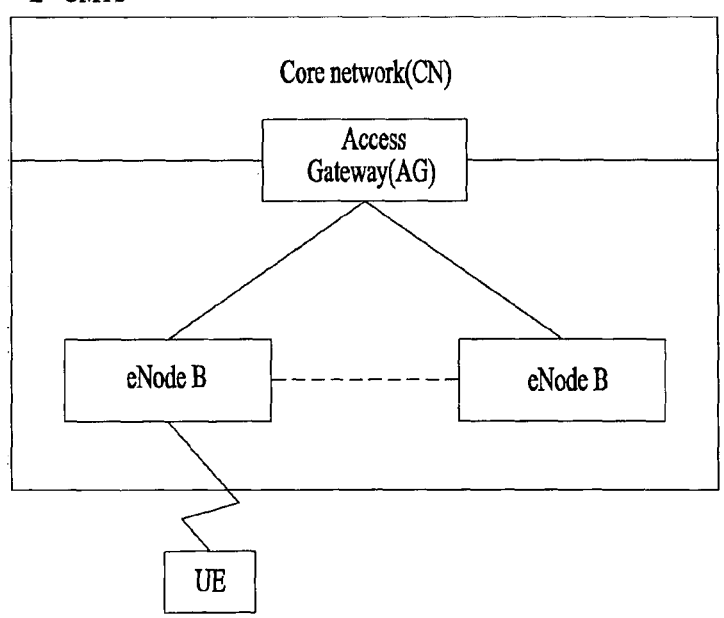
FIG. 3 illustrates a schematic structure a network structure of an evolved universal mobile telecommunication system (E-UMTS)

FIG. 3 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 3, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 4:
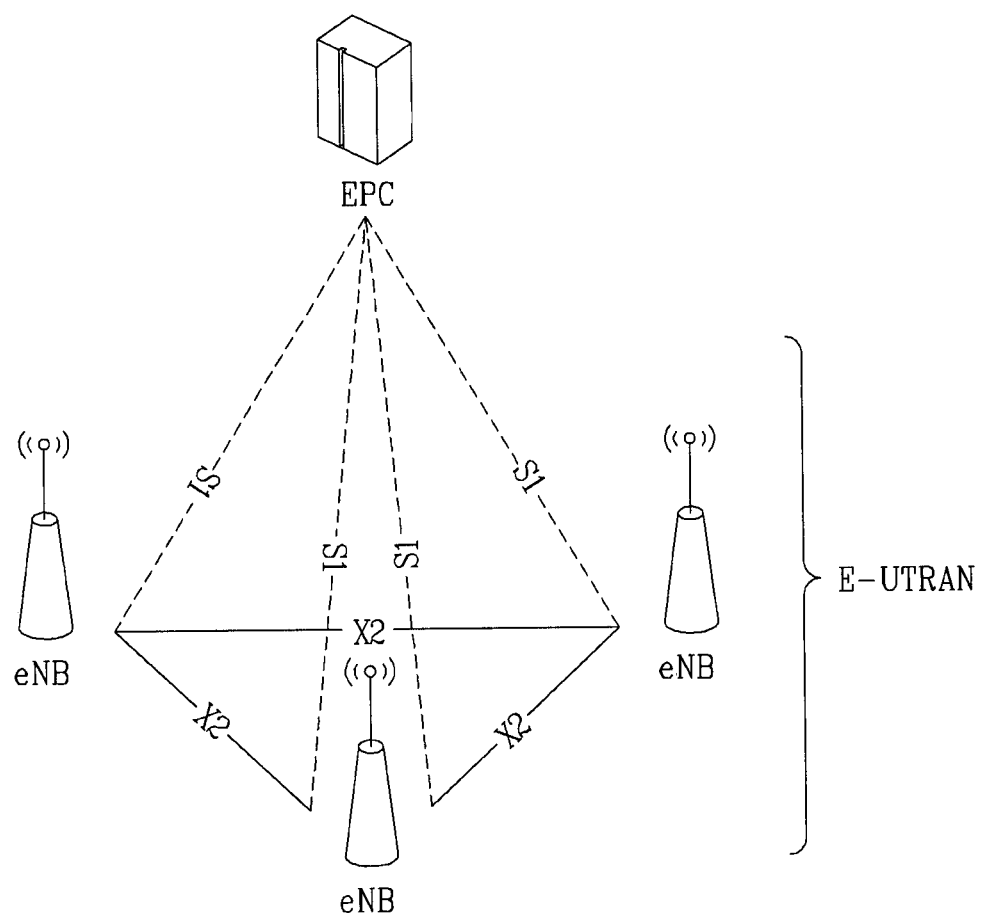
FIG. 4 illustrates a schematic structure of an Evolved Universal Terrestrial Radio Access Network (E-UTRAN)

FIG. 4 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 5 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. An Average Number of Cell-Boundary Crossing Per Unit Time

Hereinafter, it is specifically explained that the method for calculating an average number of cell-boundary crossing per unit time. This section shows how many times of a UE near the time zone boundary attempts to cross the cells.

2.1 System Layout

To coarsely, examine the rate to physically cross the cell boundary (e.g., between a cell of a Time Zone A and the other cell of the adjacent Time Zone B), we consider an ideal layout of cells in a cellular system. That is, we consider a cellular system with omnidirectional base stations organized in a hexagonal pattern. Since overlapping coverage is utilized in our algorithm, the term cell and coverage must be distinguished. The cell for an eNB is defined as the area where the nominal received signal strength from the eNB is greater than that from any other eNB. With omnidirectional antennas, uniform propagation, flat terrain conditions, and eNB's placed on a hexagonal grid, this corresponds to the usual layout with an eNB at the center of each hexagonal cell.

The cell radius 'a' is defined as the distance from a base to a vertex of its own cell. The coverage of an eNB is the area in which users can establish a link with acceptable signal quality with that eNB. The area can be modeled by a circle with an eNB at the center. The coverage radius 'R' is defined as the distance from an eNB to its coverage boundary.

2.2 User Mobility Model

We consider a UE which moves with constant speed and randomly chosen fixed direction for time T (where T is a random variable with a phase-type distribution), and changes the speed and direction. We assume that a UE moves with speed following uniform distribution with parameters $V_{min}$ and $V_{max}$. Also, the direction of a UE is assumed to have the following conditional Probability Density Function (PDF).

$$f_{\theta_i|\theta_{i-1}}(\theta_i \mid \theta_{i-1}) = \begin{cases} \frac{1}{\pi^2}(\theta_i - \theta_{i-1}) + \frac{1}{\pi}, & \theta_{i-1} - \pi < \theta_i \le \theta_{i-1} \\ -\frac{1}{\pi^2}(\theta_i - \theta_{i-1}) + \frac{1}{\pi}, & \theta_{i-1} < \theta_i \le \theta_{i-1} + \pi \\ 0, & \text{otherwise} \end{cases} \quad \text{[Equation 1]}$$

In Equation 1, $\theta_1$ (i≥1) is the moving direction after i th change from call initiation and $\theta_0$ is the moving direction at call initiation following uniform distribution with parameters 0 and $2\pi$. We assume that UE's have mobility patterns such that they do not change moving direction drastically, i.e., a UE has a tendency of keeping the current direction of movement in our model.

If the Channel Hold Time (CHT) in the first cell for a given call when using our algorithm is longer than that without our algorithm under the condition that the moving path is equal, the average number of handoffs requested by the call is fewer than that without our algorithm.

If the new call setup requests of outgoing users are connected to the approaching eNB (as A-mode attempts in our algorithm), the number of handoff requests is reduced by about 0.9 (e.g., there are 4.26 handoffs per one call during its lifetime on average when our algorithm is not used but there are 3.36 handoffs when using our algorithm). Also, utilizing our algorithm is able to reduce the average number of the total handoffs by about 0.16 almost regardless of the average speed of mobile users. The amount is almost constant relative to the average speed. This is because our algorithm reduces the unnecessary handoff of new calls (generated near the cell boundary) only.

Although traffic arrival rates for the three types of attempts are variable in reality, we assume constant arrival rates during a short observation period for the sake of simplicity and exponential service times. We analyze the blocking performance of our algorithm, and the effect of our adaptive bandwidth reservation in case of offered traffic fluctuation. Let $N_i$ be the set of neighboring eNB's of eNB i. Let $\lambda_N^i$ and $\lambda_H^i$ be the traffic rates of new calls and that of handoff calls, respectively, in cell i.

Since the call setup requests generated in a given cell is not always connected first with the eNB of the cell in our algorithm, the arrival rate of type-h attempts is not equal to $\lambda_H^i$ and that of type-a attempts is not equal to $\lambda_N^i$. The traffic arrival rate of each type of attempts can be written as following Equation 2.

$$\lambda_1^i = \lambda_H^i - P_H \sum_{j \in N_i} \frac{\lambda_2^j}{|N_i|}$$ [Equation 2]

In Equation 2, $P_H$ is the probability that a UE attempts to cross the time zone boundary of eNB j within the area of cell i. It means that the amount of $$P_H \sum_{j \in N_i} \frac{\lambda_2^j}{|N_i|}$$

is desirably reduced owing to using our method.

The traffic rate of type-a attempts (i.e., UEs attempting to cross the time zone boundary) is specified by a certain amount of selected attempts out of NO-mode attempts generated in neighboring cells of a given cell, in which an NO-mode attempt denotes a UE currently staying in an overlapping cell coverage which attempts to cross the time zone boundary. If there is no overlapping cell coverage, there are no NO-mode attempts; however, in practical situations, there exists approximately 30% of overlapping cell coverage. Thus type-a traffic rate can be written as following Equation 3.

$$\lambda_2^i = fg \sum_{j \in N_i} \frac{\lambda_N^j}{|N_i|}$$ [Equation 3]

In Equation 3, f is the average fraction of overlapping area in a cell and g is the average fraction of NOA-mode attempts out of the total new call attempts in overlapping area. The quantity of NOA-mode attempts is calculated by counting specific portion of NO-mode attempts which tend to move to cross the time zone boundary; for example, if there is 100% of UEs moving along a highway near the time zone boundary area, the quantity of NOA attempts is the same as that of NO-mode attempts. Thus fg is the average fraction of NOA-mode attempts out of the total UEs in the set of cells belonging to that time zone area.

Type-n traffic rate is specified by type-a traffic rate. That is, the traffic rate can be expressed as the rate ruling out the rate of type-a attempts such as Equation 4.

$$\lambda_3^i = \lambda_N^i(1-fg)$$ [Equation 4]

From Equations 1 to 4, we can concludes that the total traffic rate $\Sigma_{all\ i}(\lambda_1^i + \lambda_2^i + \lambda_3^i)$ which means the total offered traffic to a given system when using our algorithm is less than $\Sigma_{all\ i}(\lambda_N^i + \lambda_H^i)$ which means the total offered traffic to the same system when our algorithm is not used.

$$\sum_{all\ i}(\lambda_1^i + \lambda_2^i + \lambda_3^i) = \sum_{all\ i}\left(\lambda_H^i - P_H \sum_{j \in N_i} \frac{\lambda_2^j}{|N_i|} + fg \sum_{j \in N_i} \frac{\lambda_N^j}{|N_i|} + \lambda_N^i(1-fg)\right)$$

$$= \sum_{all\ i}(\lambda_H^i + \lambda_N^i) - P_H \sum_{all\ i}\sum_{j \in N_i} \frac{\lambda_2^j}{|N_i|} \leq$$

$$\sum_{all\ i}(\lambda_H^i + \lambda_N^i) \text{ (the equality holds if}$$

$$P_H = 0 \text{ or } fg = 0).$$

[Equation 5]

It is noted that $P_H > 0$ and $fg > 0$ in cellular mobile networks. Thus inequality 5 always shows a strict form. This means that our algorithm reduces the number of total traffic arrivals by primarily reducing the handoff traffic arrivals using the information on user mobility during the measurement time. However, this does not mean that our algorithm reduces the offered traffic. As mentioned in the previous two sections, our algorithm increases the average channel holding time. Under an even (uniform) traffic distribution condition, thus, we can simply show that the reduction and the increase will make the offered traffic be the same. In such cases, our algorithm only reduces the number of events (i.e., arrivals and departures) for a given time and, therefore, the overall blocking probability remains constant whether our algorithm runs or not.

However, under the condition of uneven (non-uniform) traffic distribution with uniform user density in each cell area, our algorithm reduces the overall blocking probability. This is because a relatively congested eNB pushes out relatively much traffic to its neighboring eNB's and vice versa. For example, let us consider two neighboring cells (cell 1 and cell 2) with offered traffics 200 and 100, respectively. In a regular mobility situation, the fraction of NOA-attempts out of total attempts for each cell is not quite different. If there are 5% of NOA-attempts in each cell, then the original offered traffics will re-distributed as 200*(1−0.05)+100*0.05=195 and 100*(1−0.05)+200*0.05=105 when using our algorithm.

This simple example shows that our algorithm may reduce the offered traffic to a relatively congested eNB by giving relatively much load to relatively less congested eNB's and by taking relatively little load from the eNB's. As a result, our algorithm may increase the offered traffic to a relatively less congested eNB. There are both positive effect on relatively congested eNB's and negative effect on relatively less congested eNB's. But these two different effects usually lead to a globally positive effect on a given system. This is because the reduced amount of the blocking probability of a congested eNB is greater than the increased amount of that of a less congested.

There are roughly 30% of overlapping cell coverage areas between two or more cells. By the use of such overlapping coverage area, it is possible to reduce the number of indications on Time Zone change. For example, if a UE is located in an overlapping coverage area, the UE can stay on the old Time Zone even if this UE has received new Time Zone information. Of course, the UE can move around and can go out of the old Time Zone area. In this particular case, the UE can change the newly received Time Zone information. That is to say, not until the UE exits the old Time Zone area (no matter it can receive new Time Zone information from a new eNB), the UE can stay on the old Time Zone to display the time information on the screen.

The inequality of Equation 5 explains that it is possible to reduce the number of indications on Time Zone changes by the use of inevitable overlapping coverage area. The Time Zone change will normally occur when a UE crosses the cell boundary. By this reason, the inequality was explained in the way that a handover occurs.

In the present invention, $\lambda_H$ denotes the arrival rate of handover calls (due to cell boundary crossing). This quantity does not include the intra-cell handover. In addition, $\lambda_N$ denotes the arrival rate of new calls.

If the overlapping coverage areas are used, the arrival rate of handover calls, denoted by $\lambda_1$, is also reduced compared to the case where the overlapping coverage area is not used since some of the original quantity $\lambda_H$ will stay on instead of immediately being handed over. Also, the arrival rate of new calls ($\lambda_2$ denotes the arrival rate of new calls generated in the overlapping coverage area, $\lambda_3$ denotes the arrival rate of new calls generated in the non-overlapping coverage area) equals to $\lambda_N$ in the overall cellular system.

In the present invention, call duration means the time interval between successful call initiation and call completion without interruption or forced termination of a call. In addition, the CHT is calculated as min (CRT, CallDuration), the CHT of HO (handover) calls is calculated as min (CRT, HO CallDuration) and the CHT of new calls is calculated as min (CRT, new CallDuration).

2. 3 Network Identity and Time Zone (NITZ)

The feature NITZ shall make it possible for a serving Public Land Mobile Network (PLMN) to transfer its current identity, universal time, Daylight Saving Time (DST) and Local Time Zone (LTZ) to MSs, and for the MS to store and use this information. Each one of these elements is optional. The feature significantly enhances the quality of user experience while roaming as it enables the accurate indication of network identities that are either newer than the mobile equipment (ME) or have changed their name since the ME was manufactured or sold. Additionally time and time zone information can be utilized by MEs as desired.

When using the default character set (see, 3GPP TS 23.038 documents), the serving PLMN shall make both a "short" and a "long" name available to the MS. As an alternative or, in addition, to the default character set, the serving PLMN can make a name available in UCS2. The MS shall be free to choose one of these names depending upon its own characteristics and/or limitations, such as those of its display.

The Network Operator may change the network identity at any time. However the change of network identity need not force immediate transfer of information to the MS.

As a network option, it shall be possible to send universal time (UT) by the network. Time information shall include information, such as Year, Month, Day, Hour, Minute, Second, Time zone and DST. The expected accuracy of the time information is in the order of minutes.

In this case, universal time indicates the time at which this information element (see, 3GPP TS 24.008 documents) may have been sent by the network. Thus it can be assumed that the accuracy of the time information when it arrives at the MS is usually within a couple minutes.

The serving PLMN shall make Local Time Zone (LTZ) available to the MS as an offset from Universal Time in units of 15 minutes.

When the LTZ is compensated for DST (summertime), the serving PLMN shall provide a DST parameter to indicate this. The adjustment for DST can be +1 h or +2 h.

For PLMNs which cover more than one time zone, it is assumed that the Network Operator will arrange for boundaries between subsets of the PLMN service area to be approximately aligned with time zone boundaries. When an MS changes Local Time Zone, the PLMN is not required to immediately transfer new time zone information. Similarly the PLMN will transfer the LTZ changes arising from summer/winter adjustments when convenient to the network operator.

The MS will implement the new time zone information at an appropriate time following receipt. The information passed to MSs supporting the NITZ feature is controlled by the serving PLMN Operator through administrative interaction.

2.4 Information Elements (IEs) Used for the Present Invention 2.4.1 MS Time Zone The "MS Time Zone" IE is used to indicate the offset between universal time and local time in steps of 15 minutes of where the MS currently resides. The "Time Zone" field in the MS Time Zone IE uses the same format as the "Time Zone" IE in 3GPP TS 24.008 document.

FIG. 6 illustrates one of MS Time Zone IEs used in the present invention.

The MS Time Zone IE is encoded as depicted in FIG. 6. The value of the Time Zone field represents the time zone adjusted for daylight saving time (DST). The value of the Daylight Saving Time field specifies the adjustment that has been made.

Bits marked as Spare shall be assigned the value 0 by the sending node and shall not be evaluated by the receiving node. In this case, the DST field has values defined as Table 1.

TABLE 1

| Daylight Saving Time | Value (binary) | |
| --- | --- | --- |
| | Bit 2 | Bit 1 |
| No adjustment for Daylight Saving Time | 0 | 0 |
| +1 hour adjustment for Daylight Saving Time | 0 | 1 |
| +2 hours adjustment for Daylight Saving Time | 1 | 0 |
| Reserved | 1 | 1 |

FIG. 7 illustrates another of MS Time Zone IE used in the present invention.

The MS Time Zone IE is encoded as depicted in FIG. 7. In this case, the MS Time Zone IE of FIG. 7 further includes "Time_Interval" field. In this case, the Time_Interval field is set as Table 2.

TABLE 2

| Time_Interval | Value (binary) | |
|---|---|---|
| | Bit 2 | Bit 1 |
| Immediate update (no waiting) | 0 | 0 |
| Time_Interval of N1 minute(s) | 0 | 1 |
| Time_Interval of N2 minute(s) | 1 | 0 |
| Time_Interval of N3 minute(s) | 1 | 1 |

In practical situations, it is possible that a UE crosses over the time zone boundary back and forth. If the time zone change is implemented on the UE immediately after crossing and if the crossing back and forth also happens, a series of time change notification may be followed, disturbing user's maneuver while moving or driving a car. Table 2 provide four options for the network operator to relevantly set the value so that for that period of time there is no further change of time zone even if a new time zone information is received. The values of N1, N2, and N3 can be set by the network operator of their choice (e.g., 1 minute, 5 minutes, 15 minutes).

2.4.2 Mobility Management (MM) Information

The MM information message is sent by the network to the MS to provide the MS with subscriber specific information. For example, the MM information includes time zone information such as the MS Time Zone IE. Table 3 denotes contents of the MM information message.

TABLE 3

| IEI | Information Element | Type/Reference | Presence | Format | Length |
|---|---|---|---|---|---|
| | Mobility management protocol discriminator | Protocol discriminator 10.2 | M | V | ½ |
| | Skip Indicator | Skip Indicator 10.3.1 | M | V | ½ |
| | MM Information message type | Message type 10.4 | M | V | 1 |
| 43 | Full name for network | Network Name 10.5.3.5a | O | TLV | 3-? |
| 45 | Short name for network | Network Name 10.5.3.5a | O | TLV | 3-? |
| 46 | Local Time Zone | Time Zone 10.5.3.8 | O | TV | 2 |
| 47 | Universal time and local time zone | Time Zone and Time 10.5.3.9 | O | TV | 8 |
| 48 | LSA Identity | LSA Identifier 10.5.3.11 | O | TLV | 2-5 |
| 49 | Network Daylight Saving Time | Daylight Saving Time 10.5.3.12 | O | TLV | 3 |

The "Full name for network" IE may be sent by the network. If this IE is sent, the contents of this IE indicate the "full length name of the network" that the network wishes the MS to associate with a Mobile Country Code (MCC) and a Mobile Network Code (MNC) contained in the Location Area Identification of the cell to which the MS sent its Channel Request message.

The "Short name for network" IE may be sent by the network. If this IE is sent, the contents of this IE indicate the "abbreviated name of the network" that the network wishes the MS to associate with the MCC and the MNC contained in the Location Area Identification of the cell to which the MS sent its Channel Request message.

The "Local Time Zone" IE may be sent by the network. The MS should assume that this time zone applies to the Location Area of the cell to which the Channel Request message was sent. If the local time zone IE has been adjusted for the DST, the network shall indicate this by including the IE Network Daylight Saving Time.

The "Universal time and local time zone" IE may be sent by the network. The MS should assume that this time zone applies to the Location Area of the cell to which the Channel Request message was sent. The MS shall not assume that the time information is accurate. If the local time zone has been adjusted for Daylight Saving Time, the network shall indicate this by including the IE Network Daylight Saving Time.

The "LSA Identity" IE may be sent by the network. The contents of this IE indicate the LSA identity of the serving cell.

The "Network Daylight Saving Time" IE may be sent by the network. If this IE is sent, the contents of this IE indicate the value that has been used to adjust the local time zone.

The MM message which has been denoted in Table 3 can be used in embodiments of the present inventions.

3. Methods for Indicating Time Zone Changes

Figure 8:
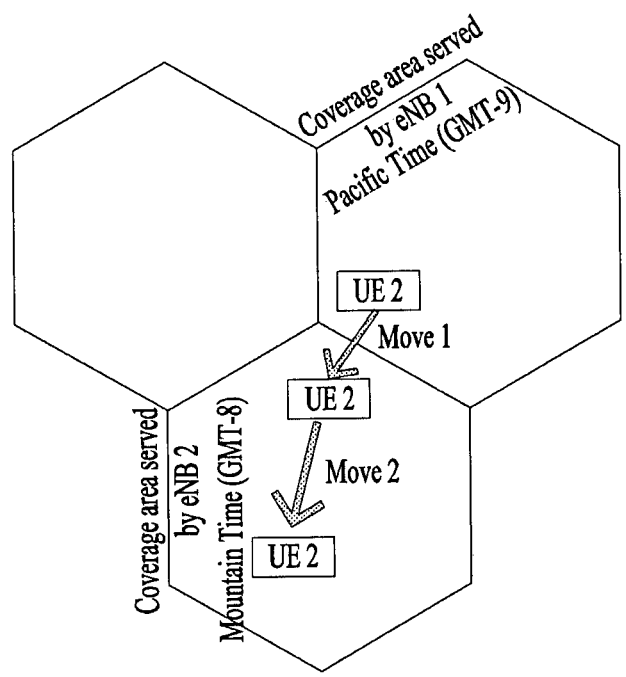
FIG. 8 illustrates that an UE moves from a boundary cell to another boundary cell.

FIG. 8 illustrates that an UE moves from a boundary cell to another boundary cell.

Referring to FIG. 8, the UE is located in an edge of the coverage area served by eNB 1 which is included in the Pacific Time Zone (GMT-9, see FIG. 1). In this case, the UE is able to move to another coverage area served by eNB 2 which is included in the Mountain Time (GMT-8, see FIG. 1). When the UE move across the boundary of the cell, the time zone is changed.

In addition, when the UE is located nearby the boundary of the eNB1 and the eNB2, the time zone of UE can be not changed. However, if the UE moves to the center of the eNB2, the time zone should be changed to the Mountain Time.

In these cases, there is needed to indicate the change of the Time Zone.

Figure 9:
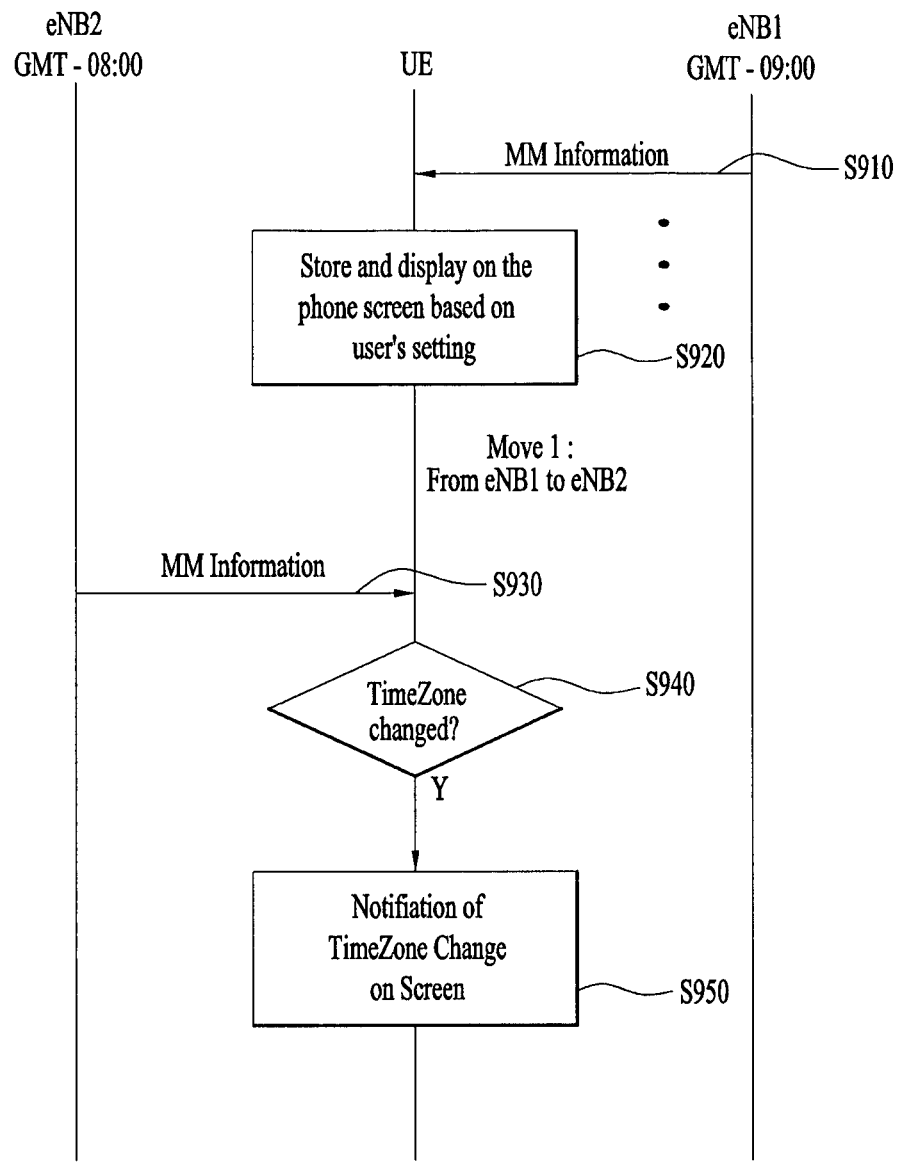
FIG. 9 illustrates one of methods for indicating time zone change.

FIG. 9 illustrates one of methods for indicating time zone change.

It is assumed that the entities illustrated in FIG. 9 are the same as described in FIG. 8. That is, the eNB1 is a serving base station of the UE and the eNB2 is a target base station of the UE.

The UE receives a first MM information message including time zone information from the eNB1 which is the serving base station of the UE. In this case, the contents of the MM information message can be referred to section 2.4 (S910).

The UE stores the contents of the MM information and displays current time according to, the MM information on the phone screen based on user's setting (S920).

After that, if the UE moves from the eNB1 to the eNB2, the US has to receive a second MM information message from the eNB2. The second MM information message from the eNB2 includes time zone information related to the time zone to which the eNB2 belongs (S930).

The UE checks the Time Zone has been changed or not by comparing the stored contents of the first MM information with the contents of the second MM information (S940).

At the step of S940, if the Time Zone is not changed, the UE maintains the displayed current time.

However, if the Time Zone is changed, the UE notifies the change of the Time Zone on the Screen. That is to say, if the second MM information message includes new Time Zone information, the UE makes an audio and/or visible display on the screen so that the user can recognize the change of time zone on the screen or by speaker system (S950).

If there is some auxiliary device connected to the UE, for example, Bluetooth earpiece, the auxiliary device can also be notified so that it can take some action (e.g., vibration or beeping, etc.) so that the user can recognize accordingly.

Figure 10:
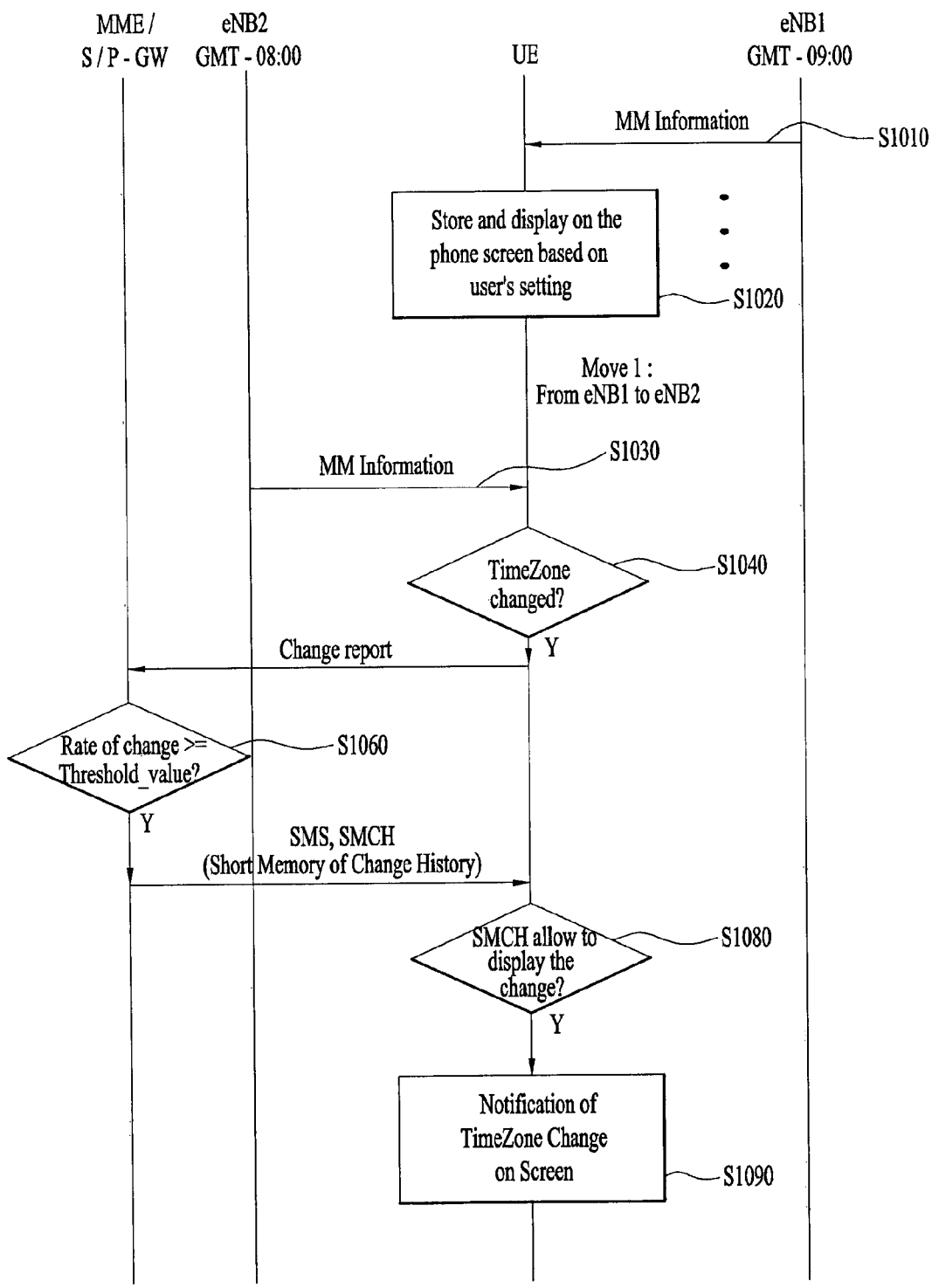
FIG. 10 illustrates another method for indicating time zone change.

FIG. 10 illustrates another method for indicating time zone change.

It is assumed that the entities illustrated in FIG. 10 are the same as described in FIG. 10. That is, the eNB 1 is a serving base station of the UE and the eNB2 is a target base station of the UE.

The UE receives a first MM information message including time zone information from the eNB 1 which is the serving base station of the UE. In this case, the contents of the MM information message can be referred to section 2.4.2 (S1010).

The UE stores the contents of the MM information and displays current time according to the MM information on the phone screen based on user's setting (S1020).

After that, if the UE moves from the eNB1 to the eNB2, the US has to receive a second MM information message from the eNB2. The second MM information message from the eNB2 includes time zone information related to the time zone to which the eNB2 belongs (S1030).

The UE checks the Time Zone has been changed or not by comparing the stored contents of the first MM information with the contents of the second MM information (S1040).

If it is determined that the Time Zone has been changed, the UE transmits a Channel Report including a time stamp to the MME (S1050).

In this case, the MME may set "threshold_value" indicating a value used to determine whether to notify the time zone change. In addition, the MME measures a "Rate of change" value based on the channel report from the UE and compares the value of Rate of change with the threshold_value (S1060).

At the step of S1060, if there were no changes during the past "parameter_value" (denoting the time interval, such as 5 minutes, 15 minutes, 1 hour, 2 hours, etc.), the value of the "Rate of change" is set to '0' or 'void (unassigned)' and the true/false test is considered to be failed (i.e., "No").

On the other hand, if the time difference between the time stamp that the Change Report has (this time stamp can be made by UE at the time of receiving a new time zone value) and the time of the most recent Change Report is greater than or equal to the "threshold_value", it is considered to be successful (i.e., "Yes").

This "Yes" is followed by (1) an SMS message from MME to the UE and (2) SMCH (Short Memory of Change History) message denoting whether or not, the UE is allowed to display the time zone change indication on the screen (S1070).

When the UE receives the SMS and SMCH messages, the UE checks the SMCH allow to display the time zone change or not (S1080).

At the step of S1080, if the SMCH does not allow the UE to display the time zone change, the UE maintains the currently displayed time.

If the SMCH indicates allowing of the time zone change, the UE notifies the change of the Time Zone on the Screen. That is to say, the UE makes an audio and/or visible display on the screen so that the user can recognize the change of time zone on the screen or by speaker system (S1090).

If there is some auxiliary device connected to the UE, for example, Bluetooth earpiece, the auxiliary device can also be notified so that it can take some action (e.g., vibration or beeping, etc.) so that the user can recognize accordingly.

In another aspect of the embodiments explained in FIG. 10 and above, the MM information can be set as FIG. 7 and Table 2. In this case, at the step of S1030, the second MM information message from the eNB2 includes the Time Interval field indicating a time interval for waiting some time to check the time zone change. For example, if the Time interval field is set to '00', the UE immediately check whether the time zone changed or not. In addition, if the Time Interval field is set to '10', the UE waiting for N2 minutes after receiving the MM information and then check the Time Zone change. The function of the Time Interval field is to prevent frequent notifying of the time zone change because it is possible that the UE can make a series of moves crossing the boundary of time zones in a short time depending on the geography and actual shape of signal propagation coverage.

After the time interval indicated by the Time Interval field, the UE checks the Time Zone has been changed or not by comparing the stored contents of the first MM information with the contents of the second MM information at the step of S1040. In this case, the steps of S1050 to S1080 do not needed to be performed.

In other approach, the steps of S1050 to S1080 can be performed other than the step of S1060. In this case, the MME dose not check the rate of change and just confirms whether to notify the Time Zone change.

4. User Interface for Indicating the Time Zone Change

Hereinafter the notifying methods and the user interfaces for indicating the time zone changes are explained in detail.

FIG. 11 illustrates the screen of the UE applied to the embodiments of the present invention.

Referring to FIG. 11(a), a touch screen of the UE is roughly divided as two regions such as a first region (1110) and a second region (1120). The first region can be called an indicator region, a status bar or a control bar region. In this case, the indicator region (1110) includes a region that is always displayed on a top end of the touch screen except a case that an application is activated as a full screen. And, indicators indicating various state information (e.g., a current time, a battery state, and an event occurrence history, etc.) related to operations of the UE can be displayed on the indicator region (1110). Especially, the indicator region (1110) includes a first time region (1130) which displays the current time according to the time zone.

FIG. 11(b) illustrates one of method for indicating the changed time to the user. The new time at a new time zone is marked in a different (or changed) color at the screen of the UE. Referring to FIG. 11(b), it can be found the changed time according to the new time zone with changed color compared with FIG. 11(a). When the changed new time is indicated in the first time region (1111), beeping or audio notification is also possible to the user. In addition, the new time can be blinking for a certain period of time (e.g., 30 seconds) for indicating the change of time.

FIG. 11(c) illustrates another method for indicating the changed time to the user. The new time at a new time zone is marked in a different (changed) color at the screen of the UE with the original time which is shrunk in size. For more specifically, at the first time region (1111), the changed new time is indicated and the original time is indicated at the second time region (1113) with shrunken size. By displaying the two kinds of times according to the different time zone, the cognitive faculty of the user can be increased. When the changed new time is indicated in the first time region, beeping or audio notification is also possible to the user. In addition, the new time can be blinking for a certain period of time for indicating the change of time.

Figure 12:
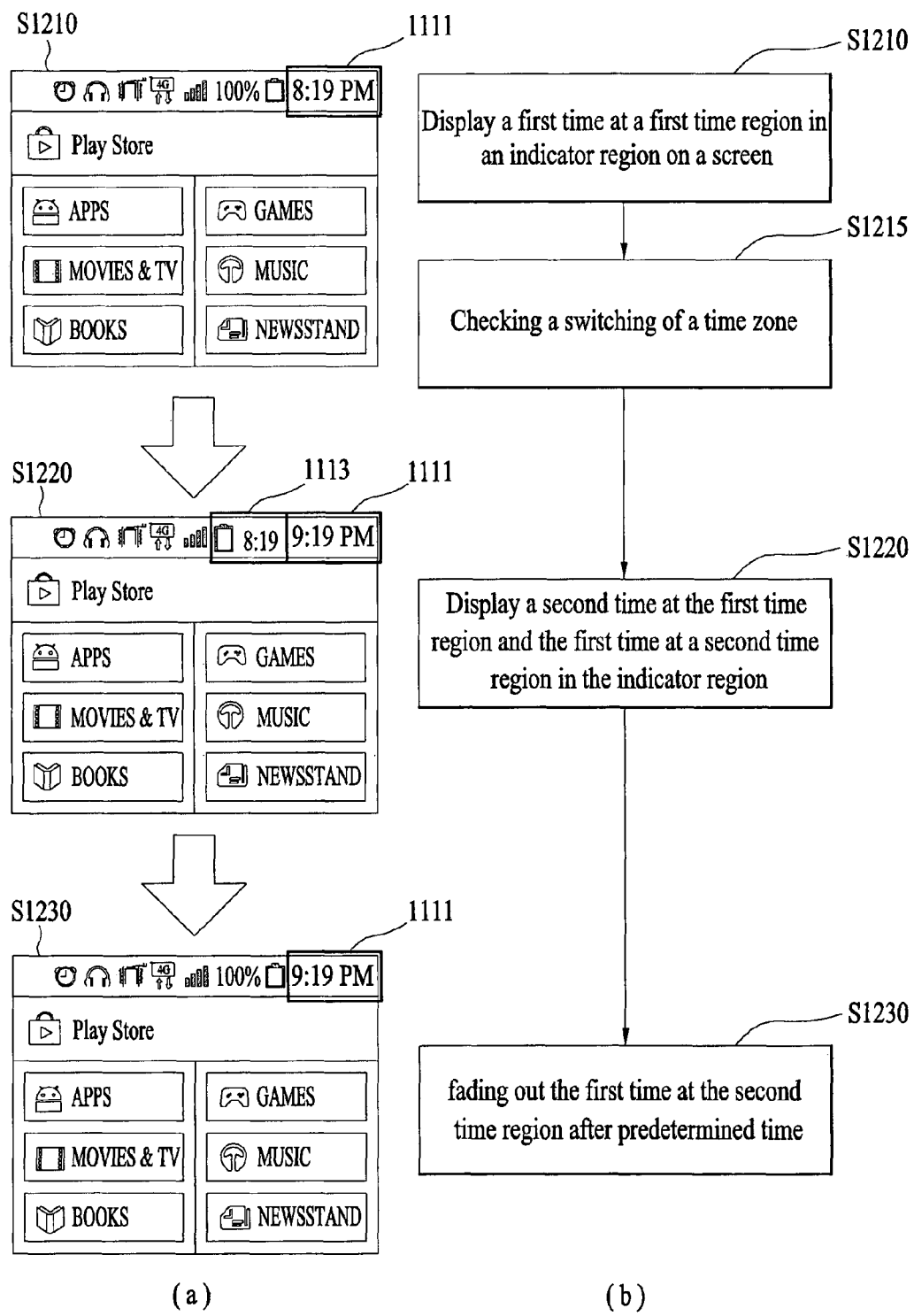
FIG. 12 illustrates indicating method of the changed time according to the time zone change.

FIG. 12 illustrates indicating method of the changed time according to the time zone change.

FIG. 12(a) shows the features of the screen according to the time zone change and FIG. 12 (b) shows the flow of how to change the time indication.

At the first time (or, during a first time zone), the UE displays a first time according to the first time zone at the first time region (1111) in the indicator region (1110) on the screen (S1210).

The UE checks a switching of the time zone by based on the MM information messages transmitted from the eNB 1 and eNB2 (see, FIGS. 9 and 10) (S1215).

If the time zone is changed, the UE displays a second time at the first time zone (1111) and displays the first time at a second time zone (1113). At that time, the size of the first time is shrunk compared to the previous size for notifying the first time zone has been passed (S1220).

At the step of S1220, the color of the second time may be changed (i.e., different color) with the first time.

Lastly, the second time region (1113) in the indicator region (1110) is fading out after predetermined time. That is, the first time is getting clouded and finally disappeared in the indicator region (S1230).

At the step of S1220 or S1230, the first time in the second time region and/or the second time in the first time region can be blinking for a certain period of time.

The embodiments explained in section 4 can be applied to the steps of S950 and S1090.

5. Use Case for Isolated E-UTRAN Operation for Public Safety (IOPS)

5.1 Isolated E-UTRAN Use Case Using a Number of eNBs

Following an outage in the E-UTRAN it may be possible to create an Isolated E-UTRAN from a number of isolated infrastructure eNBs. This is expected to result in an increase in the range of the Isolated E-UTRAN.

For example, Public Safety Officers A, B, C and D are at an incident which is occurring over a large area. Each Public Safety Officer has a UE which is ProSe-enabled; however the Public Safety Officers are communicating by means of group call via the infrastructure network.

In the present invention, the Public Safety Officer A is served by an eNB 1, the Public Safety Officer B is served by an eNB2, the Public Safety Officer C is served by an eNB3, and the Public Safety Officer D is served by an eNB4. In this case, eNB1 and eNB2 are located in Time Zone GMT-m whereas eNB3 and eNB4 are located in Time Zone GMT-n, where the time difference between GMT-m and GMT-n can be 30 minutes or 1 hour.

There is an outage in the E-UTRAN which results in the backhaul for all eNBs 1, 2, 3 and 4 becoming disconnected. In addition, the Public Safety Officers A, B, C and D are not in proximity to each other so are unable to support ProSe Group Communication provided by 'direct mode' ProSe.

In this situation, it is assumed that the eNBs 1, 2, 3 and 4 are all isolated from the infrastructure network, i.e. no backhaul connection, but retain interconnects between each other. An Isolated E-UTRAN is therefore established using the eNBs 1 2, 3 and 4. So, the Public Safety Officers A, B, C and D are in coverage of the Isolated E-UTRAN and are served by the Isolated E-UTRAN.

In this case, the Public Safety Officers A is able to move from the coverage area of eNB1 (GMT-m) to the coverage area of eNB3 (GMT-n), and the UE of the Public Safety Officers A may get updated Time Zone information from eNB3. The Public Safety Officer A is able to be aware of the Time Zone update through notification made sensible by the UE having received updated Time Zone information.

Under the IOPS situation, the UEs shall indicate to their respective Public Safety Officers that they are working within an Isolated E-UTRAN, i.e. no connection to the EPC.

Each isolated eNB shall detect a lost backhaul connection and transition to infrastructure-derived Isolated E-UTRAN operation with all eNBs to which they also have a connection. The infrastructure-derived Isolated E-UTRAN shall bar unknown isolated eNBs from joining the infrastructure-derived Isolated E-UTRAN.

The infrastructure-derived Isolated E-UTRAN shall securely admit to the system the UEs belonging to Public Safety Officers. The infrastructure-derived Isolated E-UTRAN shall admit any further authorized UEs to the system.

An eNB under IOPS operations shall provide all served UE's with Network Identity and Time Zone (NITZ) or Local Time Zone (LTZ) information. It is up to implementation how an eNB generates NITZ or LTZ. The eNB may be allowed to store up-to-date Time Zone information received from the network for the use in the event of IOPS operations.

The UE having received updated Time Zone information shall provide the Public Safety Officer with proper ways of notification that the time zone has changed in the coverage area of this eNB under IOPS operations. The Time Zone information is up to eNB's location but not to the UE's present'location.

5.2 UEs of Public Safety Officers

Figure 13:
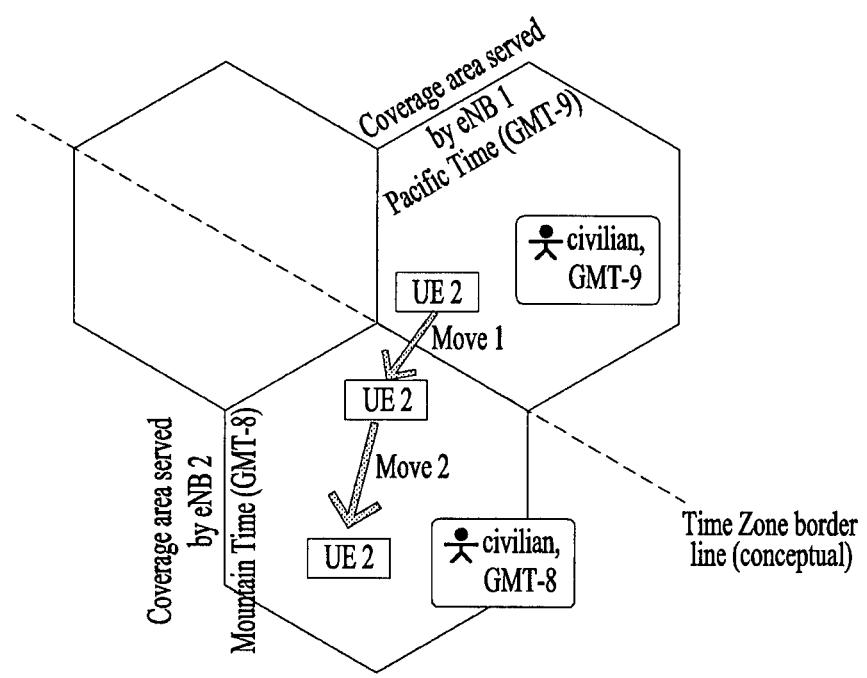
FIG. 13 depicts a case that a Public Safety UE makes a movement across cell boundary, which separates the time zone from the other, within the same zone of IOPS operation.

FIG. 13 depicts a case that a Public Safety UE makes a movement across cell boundary, which separates the time zone from the other, within the same zone of IOPS operation. Referring to FIG. 13, it is assumed that the UE2 is a UE of Public Safety Officer. The UE2 makes a series of movements across the boundary of Time Zones, still within the coverage area of TOPS operation.

Due to the unique characteristics of the Public Safety officer's role, Public Safety Officers may move from one cell coverage area to another. In particular, if these two cells (more specifically, those eNBs) are located in different Time Zones as depicted in FIG. 13. The civilians in the first cell (eNB 1) and those in the second cell (eNB2) use different time zones for their consumer electronics/devices, for example UEs, clock-watches, and home electronics, and so on.

In the example, the civilians' devices in the cell of eNB 1 will use GMT-9 whereas the civilians' devices in the cell of eNB2 will use GMT-8. In this case, it is beneficial to let the Public Safety UE1 knows of the Time Zone change by the use of eNB signaling.

The time information in Public Safety Communications is, of course, important to keep synchronized for human perception (for Public Safety Officer) as LTE/LTE-A has been chosen as the way for Public Safety Communication in the U.S.A. This also means various types of media (text, image, video, etc.) are expected to be taken and transmitted by Public Safety Officers in the near future through LTE/LTE-A systems. Those media may need exact time-stamp and/or geo-stamp.

Due to the unique characteristics of Public Safety officers' role, it is beneficial to have some mechanisms that the eNB, whether it is NeNB (Nomadic eNB) or not, under IOPS operations shall be able to provide the Public Safety UE's with Network Identity and Time Zone (NITZ) or Local Time Zone (LTZ) information, which is transferred to UE via MM information message (via NAS) in the ordinary E-UTRAN operation mode, and with proper ways of notification that the time zone has changed in the specific location where the Public Safety officer is located.

Hereinafter, the method for indicating time zone change for Public Safety officer UEs under the IOPS operation will be explained.

5.3 Methods for Indicating Time Zone Change Under IOPS

Hereinafter, the methods for indicating time zone change under IOPS based on the assumptions described sections 5.1 and 5.2.

Figure 14:
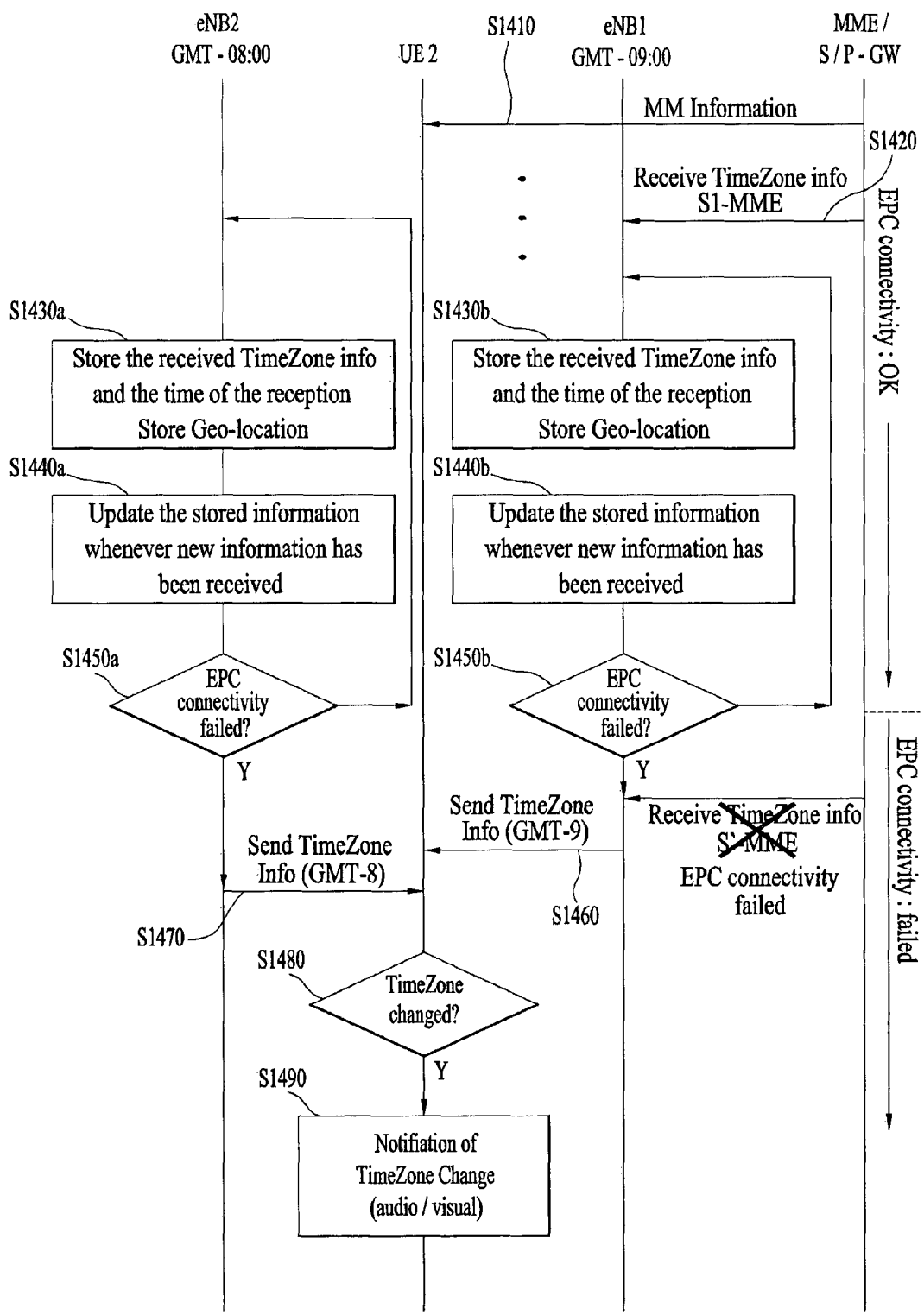
FIG. 14 illustrates flow of actions in isolated eNB(s) and actions of UE after receiving updated time zone information.

FIG. 14 illustrates flow of actions in isolated eNB(s) and actions of UE after receiving updated time zone information.

An eNB, whether it is Nomadic eNB (NeNB) or not, under IOPS operations shall be able to provide the Public Safety UE's with time zone information such as, Network Identity and Time Zone (NITZ) information or Local Time Zone (LTZ) information and with proper ways of notification that the time zone has changed in the specific location where the Public Safety officer is located.

In this case, an eNB operating in an IOPS mode is able to detect the Time Zone and be able to broadcast IOPS Time Information including the Time and Time Zone information. In addition, a NeNB shall be able to detect the Time Zone and shall be able to broadcast TOPS Time Information including the Time and Time Zone information.

Referring to FIG. 14, the IOPS mode has been enabled because inadequate outage had occurred in the E-UTRAN. Therefore, the eNB1, the eNB2, and the MME are became the member of an Isolated E-UTRAN. In addition, it is assumed that the UE2 is a UE of the Public Safety Officer, and the eNB1 is located in a time zone GMT-9 and the eNB2 is located in a time zone GMT-8.

In this case, the MME transmits a MM information message to the UE2 via NAS. The MM information message includes time zone information (S1410).

The MME transmits time zone information to the eNB1 and eNB2 which are under the control of the MME. The time zone information is able to be transmitted as periodically or event triggered manner (S1420).

The eNB1 and eNB2 store the received time zone information and the time of the reception. In addition, the eNB 1 and eNB2 may store the respective Geo-location information (S1430a, S1430b).

The eNB 1 and eNB2 update the stored information whenever new information has been received from the MME (S1440a, S1440b).

The eNB 1 and eNB2 may check Evolved Packet Core (EPC) connectivity is failed or not. This check may be performed periodically or event triggered manner (S1450a, S1450b).

However, if the time zone information from the MME is not received during certain time period (or, in the periodicity), the eNB1 and eNB2 is able to determine that the EPC connectivity is failed.

In this case, the eNB1 transmits the time zone information of its own (S1460). Besides, the eNB2 transmits the time zone information of its own (S1470).

The UE checks the Time Zone has been changed or not by comparing the contents of the MM information from the MME with the time zone information from the eNB1 and eNB2 (S1480).

At the step of S1480, if the Time Zone is not changed, the UE maintains the displayed current time.

However, if the Time Zone is changed, the UE notifies the change of the Time Zone on the Screen. That is to say the UE makes an audio and/or visible display on the screen so that the user can recognize the change of time zone on the screen or by speaker system. If there is some auxiliary device connected to the UE, for example, Bluetooth earpiece, the auxiliary device can also be notified so that it can take some action (e.g., vibration or beeping, etc.) so that the user can recognize accordingly.

6. Apparatuses for Implementing the Aforementioned Methods

Figure 15:
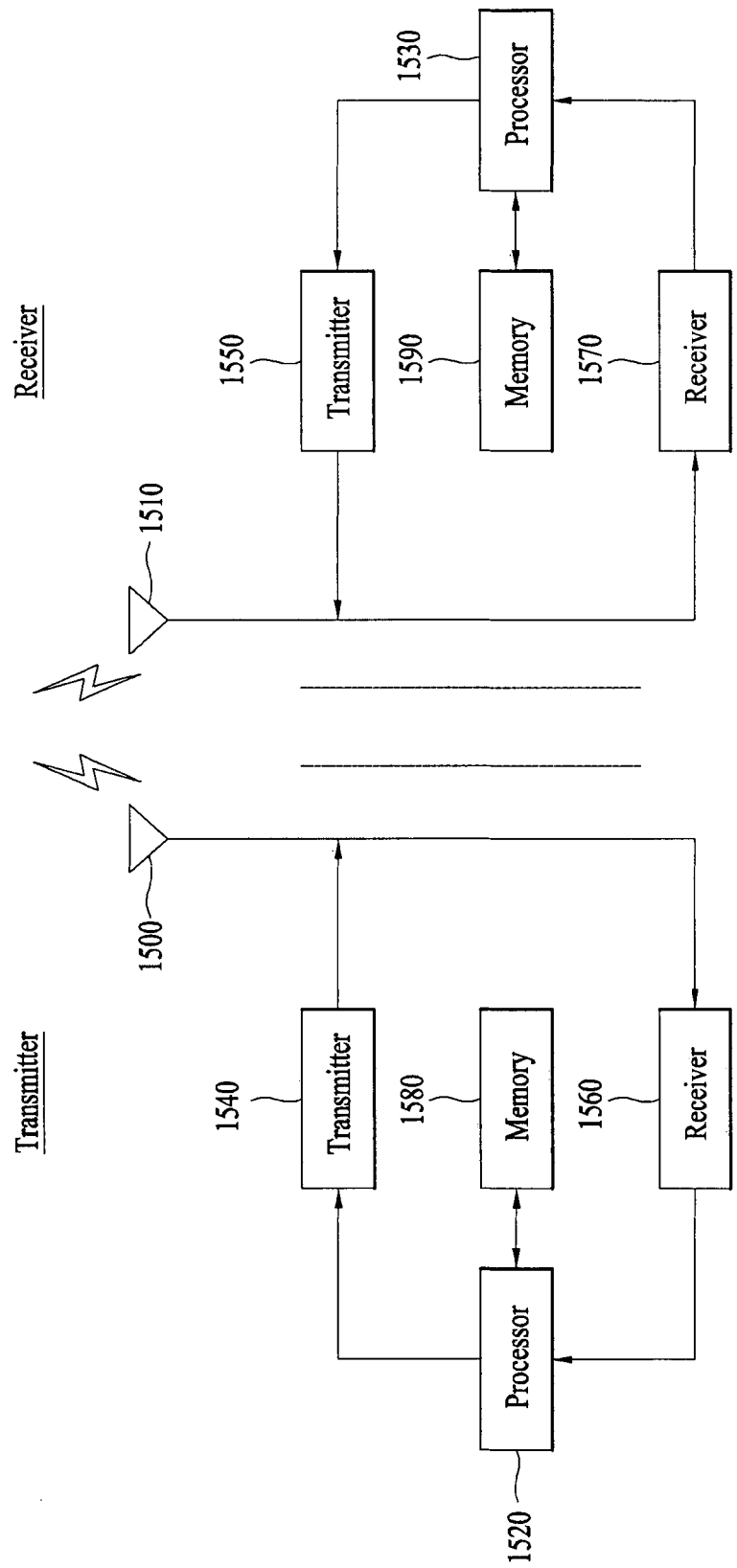
FIG. 15 shows apparatuses for implementing the above-mentioned methods described with reference to FIGS. 1 to 14.

FIG. 15 shows apparatuses for implementing the above-mentioned methods described with reference to FIGS. 1 to 14.

A UE can serve as a transmitter on uplink and as a receiver on downlink. An eNB can serve as a receiver on uplink and as a transmitter on downlink.

The UE and the eNB may include transmitter 1540 and 1550 and receiver 1560 and 1570 for controlling transmission and reception of signal, data and/or messages and antennas 1500 and 1510 for transmitting and receiving signal, data and/or messages, respectively. In this case, the UE may further include a screen to display user information such as a current time, a battery state, an event occurrence history, weather, and/or multimedia contents etc.

In addition, the UE and the eNB may respectively include processors 1520 and 1530 for performing the above-described embodiments of the present invention and memories 1570 and 1590 for storing processing procedures of the processors temporarily or continuously.

The embodiments of the present invention can be performed using the aforementioned components and functions of the UE and the eNB. The transmitter 1540 and 1550 and the receiver 1560 and 1570 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for indicating a time zone change in a wireless access system, the method performed by a user equipment (UE) and comprising:
   receiving, from a first eNode-B (eNB), first time zone information indicating a time zone of a first cell to which the first eNB belongs;
   storing the first time zone information and displaying a first time on a screen of the UE based on the first time zone information; and
   when the UE moves from an area of the first eNB to an area of a second eNB:
      receiving, from the second eNB, second time zone information indicating a time zone of a second cell to which the second eNB belongs and a time interval information;
      comparing the first time zone information with the second time zone information; and
      when the first time zone information is different from the second time zone information:
         waiting a first predetermined time indicated by the time interval information;
         after a lapse of the first predetermined time, receiving, from a third eNB, third time zone information indicating a time zone of a third cell to which the third eNB belongs,
         wherein the third eNB is an eNB to which the UE currently belongs;
         comparing the first time zone information with the third time zone information; and
         when the first time zone information is different from the third time zone information, displaying a second time based on the third time zone information on the screen.

2. The method according to claim 1, wherein the second time is displayed in the first time region with a different color from a previously displayed time for a certain period.

3. The method according to claim 1, wherein:
   the second time is displayed in a first time region on the screen,
   the first time is displayed in a second time region on the screen with shrunk size compared to the displayed second time, and
   the first time and the second time are simultaneously displayed for a second predetermined time.

4. The method according to claim 3, wherein the first time fades out on the screen after the second predetermined time.

5. The method according to claim 3, wherein the second time is displayed in the first time region by blinking for a certain period.

6. A user equipment (UE) for indicating a time zone change in a wireless access system, the UE comprising:
   a screen;
   a receiver; and
   a processor,
   wherein the processor is configured to:
      control the receiver to receive, from a first eNode-B (eNB), first time zone information indicating a time zone of a first cell to which the first eNB belongs;
      store the first time zone information and display a first time on the screen based on the first time zone information; and
      when the UE moves from an area of the first eNB to an area of a second eNB:
         control the receiver to receive, from the second eNB, second time zone information indicating a time zone of a second cell to which the second eNB belongs and a time interval information;
         compare the first time zone information with the second time zone information; and
         when the first time zone information is different from the second time zone information:
            wait a first predetermined time indicated by the time interval information;
            after a lapse of the first predetermined time, control the receiver to receive, from a third eNB, third time zone information indicating a time zone of a third cell to which the third eNB belongs,
            wherein the third eNB is an eNB to which the UE currently belongs;
            compare the first time zone information with the third time zone information; and
            when the first time zone information is different from the third time zone information, display a second time based on the third time zone information on the screen.

7. The UE according to claim 6, wherein the second time is displayed in the first time region with a different color from a previously displayed time for a certain period.

8. The UE according to claim 6, wherein:
   the second time is displayed in a first time region on the screen,
   the first time is displayed in a second time region on the screen with shrunk size compared to the displayed second time, and
   the first time and the second time are simultaneously displayed for a second predetermined time.

9. The UE according to claim 8, wherein the first time fades out on the screen after the second predetermined time.

10. The UE according to claim 8, wherein the second time is displayed in the first time region by blinking for a certain period.

* * * * *